United States Patent [19]

Commandeur et al.

[11] Patent Number: 5,593,613
[45] Date of Patent: *Jan. 14, 1997

[54] HEAT TRANSFER FLUIDS COMPRISING MONO- AND BIS(METHYLBENZYL)XYLENE ISOMERS

[75] Inventors: Raymond Commandeur, Vizille; Jean-Pierre Sarron, Chatou, both of France

[73] Assignee: Elf Atochem S.A., Puteaux, France

[*] Notice: The term of this patent shall not extend beyond the expiration date of Pat. No. 5,384,058.

[21] Appl. No.: 283,183

[22] Filed: Aug. 3, 1994

Related U.S. Application Data

[63] Continuation of Ser. No. 90,441, Apr. 20, 1993, Pat. No. 5,384,058, which is a continuation of Ser. No. 840,199, Feb. 24, 1992, abandoned.

[30] Foreign Application Priority Data

Feb. 22, 1991 [FR] France ................. 91 02172

[51] Int. Cl.$^6$ ......................................... C09K 5/00
[52] U.S. Cl. ................... 252/73; 165/104.19; 585/1; 585/25
[58] Field of Search .................. 252/73; 585/1, 585/25; 165/104.11, 104.19

[56] References Cited

U.S. PATENT DOCUMENTS 2,933,450  4/1960  Lyding ........................ 252/73
4,957,815  9/1990  Commandeur et al. ............ 428/402.2
5,384,058  1/1995  Commandeur et al. .............. 252/73

*Primary Examiner*—Christine Skane
*Attorney, Agent, or Firm*—Burns, Doane, Swecker & Mathis, L.L.P.

[57] ABSTRACT

Unique heat transfer fluid media include (methylbenzyl)xylene or a composition comprising admixture of the compounds (A):

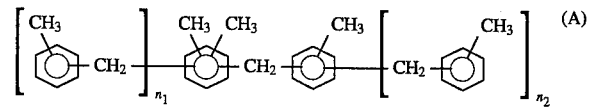

in which $n_1+n_2=0$ or 1, wherein a fraction of such compounds (A) $n_1+n_2=0$ and further wherein another fraction of such compounds (A) $n_1+n_2=1$; the tricyclic compounds (A) may be replaced, in whole or in part, by a tricyclic compound (B):

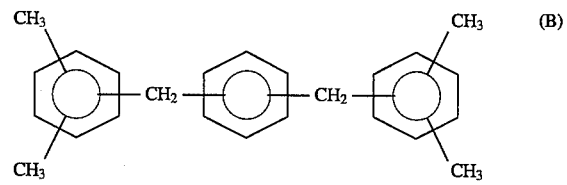

2 Claims, No Drawings

HEAT TRANSFER FLUIDS COMPRISING MONO- AND BIS(METHYLBENZYL)XYLENE ISOMERS

This application is a continuation of application Ser. No. 08/090,441, filed Apr. 20, 1993, now U.S. Pat. No. 5,384,058 which is a continuation application of Ser. No. 07/840,199 filed Feb. 24, 1992 now abandoned.

BACKGROUND OF THE INVENTION

1. Field of the Invention

The present invention relates to the use of mono- and bis(methylbenzyl)xylene isomers as heat transfer fluids.

2. Description of the Prior Art

The principle of heat exchange by means of fluids other than water is described in Kirk-Othmer, *Encyclopedia of Chemical Technology*, 3rd Edition, Vol. 12, pages 171–190. It describes the use of mineral or synthetic oils having a boiling point, under atmospheric pressure, ranging from 200° to 400° C. The heat transfer may be carried out under atmospheric pressure, or under a few bars of pressure, instead of the very high water vapor pressure at the same temperature.

The use of dibenzyltoluene and bis(methylbenzyl)toluene as a heat transfer medium is described in U.S. Pat. No. 3,475,115. However, bis(methylbenzyl)toluene is solid at −17° C. and its viscosity at 20° C. is 204 centistokes. With respect to dibenzyltoluene, its pour point is −34° C. and its viscosity at 20° C. is 35 centistokes.

SUMMARY OF THE INVENTION

A major object of the present invention is the provision of improved heat transfer fluids comprising (methylbenzyl)xylene or admixture of mono- and bis(methylbenzyl)xylenes.

Another object of the present invention is the provision of improved heat transfer fluids that remain liquid at very low temperatures and are very stable at high temperatures.

Briefly, the present invention features the use of (methylbenzyl)xylene or admixture of compounds having the formula (A):

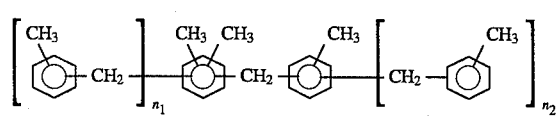

(A)

in which $n_1$ and $n_2=0$ or 1 and further wherein $n_1+n_2=1$ or 2, as heat transfer fluids.

DETAILED DESCRIPTION OF THE PREFERRED EMBODIMENTS OF THE INVENTION

More particularly according to the present invention, the subject heat transfer fluids advantageously comprise the bicyclic compound (A), (methylbenzyl)xylene, and the tricyclic compound (A), designated bis(methylbenzyl)-xylene. The tricyclic compound (A) may be such that $n_1=1$ and $n_2=0$, the compound such that $n_1=0$ and $n_2=1$, or a mixture of these two compounds. It is also within the scope of this invention that the subject heat transfer fluids also comprise compounds wherein $n_1=1$ and $n_2=1$.

The proportions of the bicyclic and tricyclic compounds in the subject heat transfer fluids may vary over wide limits. For low temperature applications, it is advantageous that the ratio of bicyclic compound/tricyclic compound(s) (by weight) ranges from 65/35 to 90/10. If it is desired to maintain the fluid quiescent at a temperature below −50° C. without the development of crystals or a solid phase beginning to develop, it is preferable that the above ratio range from 82/18 to 87/13.

It is also within the scope of the invention to replace all or a portion of the tricyclic compound (A) by a compound (B) having the formula:

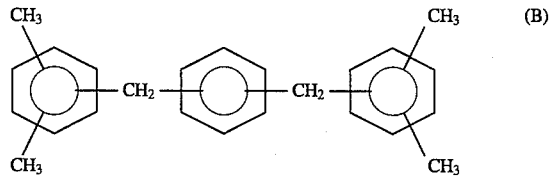

(B)

The compound (A) may be prepared by condensing methylbenzyl chloride with xylene in the presence of a Friedel-Crafts catalyst. A mixture of bicyclic and tricyclic compound is produced. It is also possible to obtain heavier products; a simple distillation suffices for isolation of the bicyclic and tricyclic compounds and adjustment of their respective proportions.

The compound (B) may be prepared by condensing xylyl dichloride $CH_2Cl$—$C_6H_4$—$CH_2Cl$ with xylene in the presence of a Friedel-Crafts catalyst.

The compound (B) may be separated by distillation in the event that heavy products are produced at the same time.

It is also possible to prepare a mixture of (A) and (B) directly by carrying out a radical chlorination of xylene to produce methylbenzyl chloride $CH_3$—$C_6H_4$—$CH_2Cl$ and xylyl dichloride $CH_2Cl$—$C_6H_4$—$CH_2Cl$ in admixture with xylene, namely, a partial chlorination is carried out and a Friedel-Crafts catalyst is then added. If appropriate, a distillation may be carried out in order to obtain a mixture of bicyclic and tricyclic compound (A) and compound (B). This process is described in European Patent No. 299,867, hereby expressly incorporated by reference.

According to this process, chlorination followed by a Friedel-Crafts condensation directly produces a mixture containing:

65 to 90 parts of compound (A) wherein $n_1+n_2=0$, and 35 to 10 parts of a mixture of compound (A) wherein $n_1+n_2=1$, and compound (B), the proportion of (A)/$n_1+n_2=1$ and (B) being about 3 parts of (A)/$n_1+n_2=1$ per part of (B).

This relationship can also be represented as:

[bicyclic]  65 to 90 parts of compound (A) wherein $n_1 + n_2 = 0$,

[tricyclic] $\begin{cases} 35 \times 3/4 \text{ to } 10 \times 3/4 \text{ parts of compound (A)} \\ \text{wherein} \\ n_2 + n_2 = 1 \\ 35 \times 1/4 \text{ to } 10 \times 1/4 \text{ parts of compound (B).} \end{cases}$ The heat transfer fluids of this invention present a good compromise with regard to physical characteristics:

(a) Boiling point higher than at 310° C., (b) Low viscosity at ambient temperature (about 20 $mm^2/s^{-1}$ 20° C.), (c) Freezing point of <−30° C. (for the compositions based on ortho-xylene, or compositions obtained from the mixture of ortho with meta or para isomers because the composition containing para-xylene alone crystallizes at about 0° C.).

If the heat transfer fluids of the invention are compared with the customary benzene alkylates:

(i) the heavy alkylates (10% of aromatic hydrogen to 90% of aliphatic hydrogen) have a boiling point of 330° C., but a viscosity of 100 mm$^2$/s$^{-1}$ at 20° C., and (ii) the more lightweight alkylates (16% of aromatic hydrogen to 84% of aliphatic hydrogen) have a viscosity of 15 mm$^2$/s$^{-1}$ at 20° C., but a boiling point of only 270° C.

The compositions of the invention display distinctly better thermal stability than the typical benzene alkylates and little tendency to form benzene.

In order to further illustrate the present invention and the advantages thereof, the following specific examples are given, it being understood that same are intended only as illustrative and in nowise limitative.

EXAMPLE 1

424 g of ortho-xylene (4 mol) were placed into a reactor fitted with a stirrer, a condenser, a chlorine feed tube and a 30 watt Philips TLADK lamp; 71 g of gaseous chlorine (1 mol) were then introduced, while maintaining the temperature at 80° C. for 1 hour.

After photochemical initiation was completed, the reaction mixture was placed in a dropping funnel and was introduced over the course of 1 hour into a reactor fitted with a stirrer and containing 2 mol of ortho-xylene and 60 mg of FeCl$_3$, at a temperature of 100° C. The entire mixture was stirred for an additional 1 hour at 100° C. after all of the reaction mixture had been introduced. The excess ortho-xylene was removed by distillation under a vacuum of 10 mm of mercury using a column of a few plates, such that the residual ortho-xylene content in the bottoms fraction was less than 500 ppm (bottoms temperature upon completion of distillation=190° C.).

The yield by weight, calculated from the ortho-xylene consumed, was 97%.

The mixture was subjected to a distillation using a few plates under 0.5 mm of mercury. Produced were:

(1) a colorless liquid fraction distilling at a temperature of 120–140° C. consisting of the product $(A)/n_1+n_2=0$. This fraction is designated XX01.

(2) a viscous pale yellow liquid fraction distilling at a temperature of 195°–215° C. which crystallized slowly at ambient temperature. Its composition by weight was as follows:

75% of compound $(A)/n_1+n_2=1$, di(methylbenzyl)xylene, and

25% of compound (B). This fraction is designated XX02.

The above fractions were mixed to produce a composition containing:

(i) 85 parts of $(A)/n_1+n_2=0$, and (ii) 15 parts of the second fraction, i.e., 85 parts of $(A)/n_1+n_2=0$, 15×0.75=11.25 parts of $(A)/n_1+n_2=1$, and 15×0.25=3.75 parts of (B).

Crystallization began after a few months at −50° C.

The same experiments were carried out, but using compositions prepared as in Example 1, except that a mixture of 75% of ortho-xylene and 25% of para-xylene was used in place of 100% of ortho-xylene.

None of the samples indicated the beginning of crystallization even after several months at −50° C.

EXAMPLE 2

320 g of a mixture of oligomers obtained in Example 1 and having the following composition:

XX01=85%

XX02=15% kinematic viscosity=21.6 mm$^2$/s$^{-1}$ (at 20° C.) were placed in a 1 liter glass reactor fitted with a rotary stirrer, a vertical condenser, a thermometer pocket and a nitrogen injector.

The atmosphere above the liquid was purged with a stream of nitrogen via the inlet device. The introduction of nitrogen was then terminated and the condenser outlet was connected to a water vessel. The product was heated progressively to a temperature of 313° C., with stirring. The product was then maintained at 313° C. for 118 hours, with stirring. The release of gas into the water vessel was 200 cm$^3$ (infrared analysis of the gases indicted the presence of methane).

The reactor was cooled and the upper regions and also the condenser were rinsed with the product remaining in the bottom of the reactor and the entire mixture was analyzed by gas phase chromatography:

|  | Initial | Composition after 118 h at 313° C. |
| --- | --- | --- |
| benzene | 1 ppm | 2 ppm |
| toluene | 20 ppm | 20 ppm |
| ortho-xylene | 70 ppm | 190 ppm |

No other lightweight products were detected.

EXAMPLE 3

A heavy benzene alkylate typically used as heat transfer fluid in the temperature range from −10° C. to +310° C. was maintained at 313° C. for 118 h in an apparatus and under operating conditions identical to those of Example 2. NMR analysis of this composition indicated a distribution of 90% aliphatic hydrogen to 10% aromatic hydrogen, the aliphatic chain being branched. The kinematic viscosity at 20° C. was 103 mm$^2$/s$^{-1}$.

At the end of the experiment, the amount of gas released into the water vessel was 1,250 cm$^3$ (mixture of alkanes and alkenes according to infrared analysis).

Chromatographic analysis of the liquid in the reactor after rinsing the upper regions and the condenser as in Example 2 gave the following results:

|  | Initial | Composition after 118 h at 313° C. |
| --- | --- | --- |
| benzene | <2 ppm | <80 ppm |
| toluene | <3 ppm | <50 ppm |
| total lightweight products | <1,000 ppm | 8,000 ppm |

The lightweight products corresponded to compositions having a boiling point of from 40° to 130° C. The number of these products was very high (several tens), which made the chromatogram very complex and did not permit a conclusion to be reached as to the presence or absence of benzene. A peak present at the retention time of benzene was found.

EXAMPLE 4

180 g of composition corresponding to the XX02 of Example 1 were treated for 20 h at 370° C. in the same apparatus as that of Example 1.

Chromatographic analysis of the product after rinsing the apparatus as in Example 2 gave the following results:

|  | Initial XX02 | XX02 after heat treatment |
| --- | --- | --- |
| benzene content | <5 ppm | 15 ppm |

The degradation product was essentially xylene.

EXAMPLE 5

180 g of dibenzyl-ortho-xylene (not according to the invention):

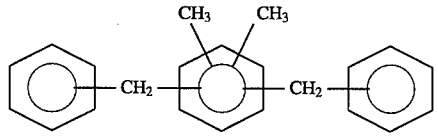

which compound was prepared by reacting benzyl chloride with ortho-xylene, were treated for 20 h at 370° C. in the same apparatus as that of Example 1.

Chromatographic analysis of the product after rinsing the apparatus as in Example 2 gave the following results:

|  | Initial | Composition after heat treatment |
| --- | --- | --- |
| benzene content | <5 ppm | 840 ppm | i.e., an amount of benzene 56 times higher than that obtained with the composition of the type XX02.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. In a heat transfer process employing a heat transfer fluid medium, the improvement which comprises using as the heat transfer fluid therefor a composition comprising (methylbenzyl)xylene and further comprising a compound (B) having the formula:

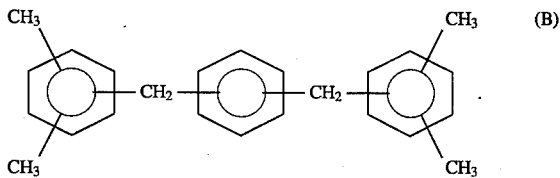

2. The heat transfer process of claim 1 wherein the heat transfer fluid consists essentially of (methylbenzyl)xylene and a compound (B) having the formula:

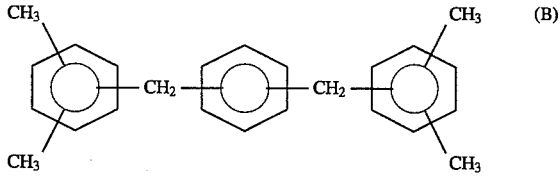

* * * * *